United States Patent
Tian et al.

(10) Patent No.: US 11,782,705 B2
(45) Date of Patent: Oct. 10, 2023

(54) SCENE SWITCHING METHOD, DEVICE AND MEDIUM

(71) Applicants: Beijing Zhongxiangying Technology Co., Ltd., Beijing (CN); BOE TECHNOLOGY GROUP CO., LTD., Beijing (CN)

(72) Inventors: Chunhu Tian, Beijing (CN); Guangyu Shao, Beijing (CN); Wenjuan Li, Beijing (CN); Hong Wang, Beijing (CN)

(73) Assignees: BEIJING ZHONGXIANGYING TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 148 days.

(21) Appl. No.: 17/514,323

(22) Filed: Oct. 29, 2021

(65) Prior Publication Data

US 2022/0206790 A1 Jun. 30, 2022

(30) Foreign Application Priority Data

Dec. 24, 2020 (CN) .......................... 202011572965.X

(51) Int. Cl.
*G06F 8/77* (2018.01)
*G06F 9/445* (2018.01)

(52) U.S. Cl.
CPC ............ *G06F 8/77* (2013.01); *G06F 9/44521* (2013.01)

(58) Field of Classification Search
CPC ............................... G06F 8/77; G06F 9/44521
USPC ......................................................... 717/101
See application file for complete search history.

(56) References Cited

U.S. PATENT DOCUMENTS

| 8,578,329 | B1 * | 11/2013 | Chiluvuri | G06F 8/36 717/106 |
| 9,405,515 | B1 * | 8/2016 | Bertram | G06F 8/41 |
| 11,500,665 | B2 * | 11/2022 | Wallach | G06F 9/45558 |
| 2011/0296151 | A1 * | 12/2011 | Martinez | G06F 8/71 713/1 |

(Continued)

FOREIGN PATENT DOCUMENTS

CN 107066257 A 8/2017

OTHER PUBLICATIONS

Title: Scene-independent group profiling in crowd, author: J Shao, et al, published on 2014.*

(Continued)

*Primary Examiner* — Chameli Das
(74) *Attorney, Agent, or Firm* — Myers Bigel, P.A.

(57) ABSTRACT

This application discloses a scene switching method, device and medium. The method includes after having loaded a first Activity interface of an application development project, removing a first scene contained in the first Activity interface in response to an operation of loading a second Activity interface of the application development project loading the second Activity interface and loading the first scene in the second Activity interface, replacing the first scene with a second scene in the second Activity interface, the multiple scenes being provided by a scene development project imported into the application development project, and the first Activity interface and the second Activity interface being developed and obtained by the application development project.

17 Claims, 4 Drawing Sheets

(56) References Cited

U.S. PATENT DOCUMENTS

2019/0361694 A1\* 11/2019 Gordon ................ G06F 1/3231
2020/0034101 A1\* 1/2020 Wang .................... G06F 16/176
2020/0241892 A1\* 7/2020 Tu ....................... G06F 9/44521

OTHER PUBLICATIONS

Title: Defining and substantiating the terms scene, situation, and scenario for automated driving, author: S Ulbrich et al, published on 2015.\*

\* cited by examiner

SCENE SWITCHING METHOD, DEVICE AND MEDIUM

RELATED APPLICATIONS

The present application claims the benefit of Chinese Patent Application No. 202011572965.X filed on Dec. 24, 2020, the entire disclosure of which is incorporated herein by reference.

TECHNICAL FIELD

This application relates to the field of software development technology, and in particular, to a scene switching method, apparatus, device and medium.

BACKGROUND

In software development, in general, a terminal application is developed based on an application development project, for example, an Android project. However, with the development of the game field, it is needed to insert some three-dimensional images with a strong sense of movement in a developed interactive page, to improve the visibility of the interactive page. An example of the interactive page is for example an interactive page developed when utilizing a scene development project, for example, a Unity project, to develop a three-dimensional image as a scene-filled Android project. Unity is a real-time content development platform very widely applied in the world, and provides developers of a broad range of fields such as games, automobiles, construction engineering, film and television animation, and the like with powerful and easy-to-use tools to create, operate and realize 3D, 2D VR and AR visualization experiences.

However, when performing hybrid development based on a scene development project and an application development project, for example, loading of an Activity of an Android development project is not smooth enough, and sometimes problems of getting stuck, flashback, black screen or white screen, etc. will exist. This will affect scene switching in an application, and create very bad user experience. The Activity is one of the most basic and the most commonly used four components (Activity, Service, Content Provider and Broadcast Receiver) in Android components. An Activity is an application component and provides a screen which may be used by a user to interact therewith to complete a certain task. All the operations in the Activity are closely related with the user, it is a component responsible for interaction with the user, and a specified control may be displayed by setContentView(View). In an Android application, one Activity is generally one separate screen, and it may display some controls thereon, and may also monitor and process a user's event and respond thereto.

SUMMARY

In view of the above defects or deficiencies in reference technology, it is intended to provide a scene switching method, device and medium for an application development project, to solve the above problems existing in scene switching.

In a respect, an embodiment of this application provides a scene switching method including: after having loaded a first Activity interface of an application development project, removing a first scene contained in the first Activity interface in response to an operation of loading a second Activity interface of the application development project, loading the second Activity interface and loading the first scene in the second Activity interface, and replacing the first scene with a second scene in multiple scenes in the second Activity interface, the multiple scenes being provided by a scene development project imported into the application development project in advance, and the first Activity interface and the second Activity interface being developed and obtained by the application development project.

In a respect, an embodiment of this application provides an electronic device including a memory, a processor and a computer program which is stored in the memory and can be run on the processor, the processor implementing the method described in the embodiments of this application when executing the program.

In a third respect, an embodiment of this application provides a computer readable storage medium storing a computer program thereon, which computer program is used for implementing the method described in the embodiments of this application.

The embodiments of this application provide a scene switching method, device and medium. The method includes: after having loaded a first Activity interface, removing a first scene contained in the first Activity interface in response to an operation of loading a second Activity interface; loading the second Activity interface and loading the first scene in the second Activity interface; replacing the first scene with a second scene in multiple scenes in the second Activity interface, the multiple scenes being provided by a scene development project imported into an application development project in advance, and the first Activity interface and the second Activity interface being developed and obtained by the application development project. By a processing mechanism of removal-addition-replacement, the embodiments of this application achieve switching of multiple three-dimensional scenes, increase the speed of page loading, and thereby overcome problems of flashback, black screen, etc. during scene switching.

BRIEF DESCRIPTION OF THE DRAWINGS

Other features, objects and advantages of this application will become more evident by reading a detailed description of non-limiting embodiments made with reference to the following drawings.

DETAILED DESCRIPTION

Figure 1:
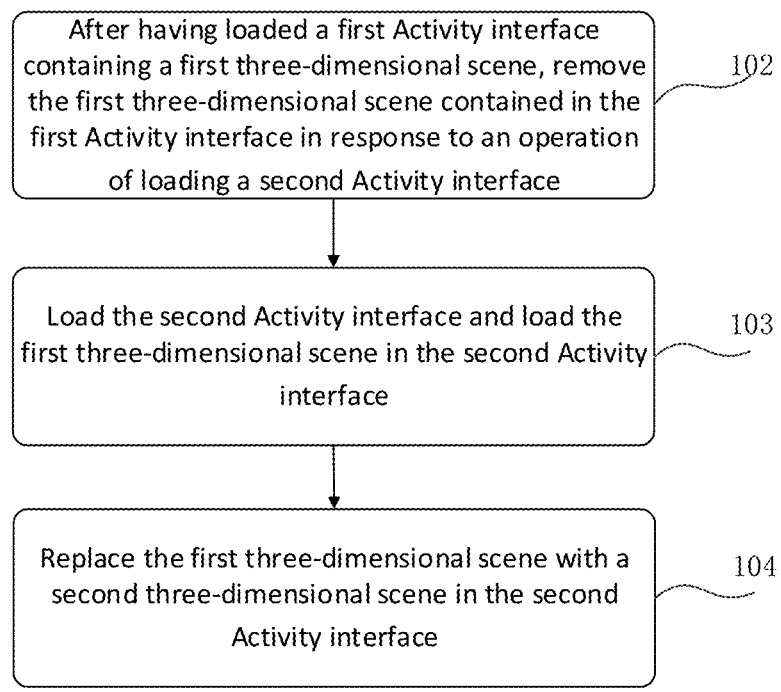
FIG. 1 shows a flow diagram of a scene switching method for an application development project proposed by an embodiment of this application.

In the following the application will be further described in detail in conjunction with the drawings and embodiments.

It may be appreciated that the specific embodiments described herein are merely used for explaining the related disclosure, but not limiting the disclosure. In addition, it further needs to be noted that only those parts related with the disclosure are shown in the drawings for the convenience of description.

It needs to be noted that, in the absence of conflict, the embodiments in this application and the features in the embodiments may be combined with each other. In the following, the application will be described in detail with reference to the drawings and in conjunction with the embodiments.

In the related art, an application development project, for example an Android development project, such as an Android Studio native project, may export a Unity project in a form of Android Studio. Android Studio imports the Unity project in a form of a module, and then modifies the build.gradle file and the AndroidManifest.xml file of the Unity project, and finally the Android Studio native project calls the Unity project by way of module.

When conducting hybrid development for the Unity project and the Android development project, it is necessary to achieve interaction between the Unity project and the Android development project by an interface class of the Unity project, for example, the UnityPlayerActivity class. The Unity project is used for providing an Activity interface developed by the Android development project with filling content, which may also be called a scene. The scene may be of any dimension, which is not intended to be limited by this disclosure, including 2D, 3D, etc. After the Unity project has developed multiple scenes, the developed multiple scenes are imported into the Android development project. The Activity interface provided by the Android development project may call the multiple scenes developed by the Unity project. For example, when scene switching is needed in the Activity interface, the problem of getting stuck or black screen or the like may exist in some types of computers, and if a default interface class provided by the Unity project is utilized to forcibly implement a single method, then the problem of white screen or flashback may exist.

It should be noted that the application development project of this disclosure is not limited to the Android development project, but may be any suitable application development project adapted to running on an electronic device, including but not limited to an Apple® development project, etc. The scene development project is also not limited to the Unity development project, but may be any suitable scene development project adapted to running on an electronic device.

To solve this problem, this application proposes a scene switching method for an application development project, which is intended to solve the problems of getting stuck, flashback, white screen or black screen or the like existing in switching multiple scenes developed by a scene development project (e.g., Unity) called by an Activity interface of an application development project.

In the following, reference is made to FIG. 1, which shows a flow diagram of a scene switching method for an application development project proposed by an embodiment of this application. As shown in FIG. 1, the method may be performed by a scene switching apparatus for an application development project, and the scene switching apparatus for an application development project may be pre-configured in an electronic device. The method includes:

step 102, after having loaded a first Activity interface of the application development project, removing a first scene contained in the first Activity interface in response to an operation of loading a second Activity interface of the application development project;

step 103, loading the second Activity interface and loading the first scene in the second Activity interface; and step 104, replacing the first scene with a second scene in multiple three-dimensional scenes in the second Activity interface.

At the above steps, the multiple three-dimensional scenes are provided by a scene development project imported into the application development project in advance.

Figure 3A:
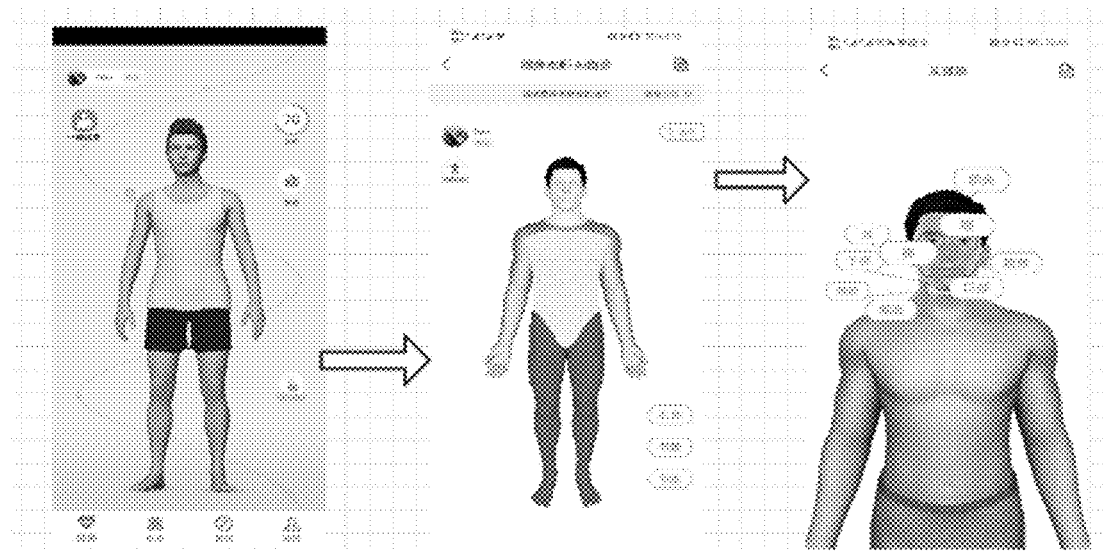
FIG. 3a shows a schematic diagram of scene switching for an application development project provided by an embodiment of this application.
Figure 3B:
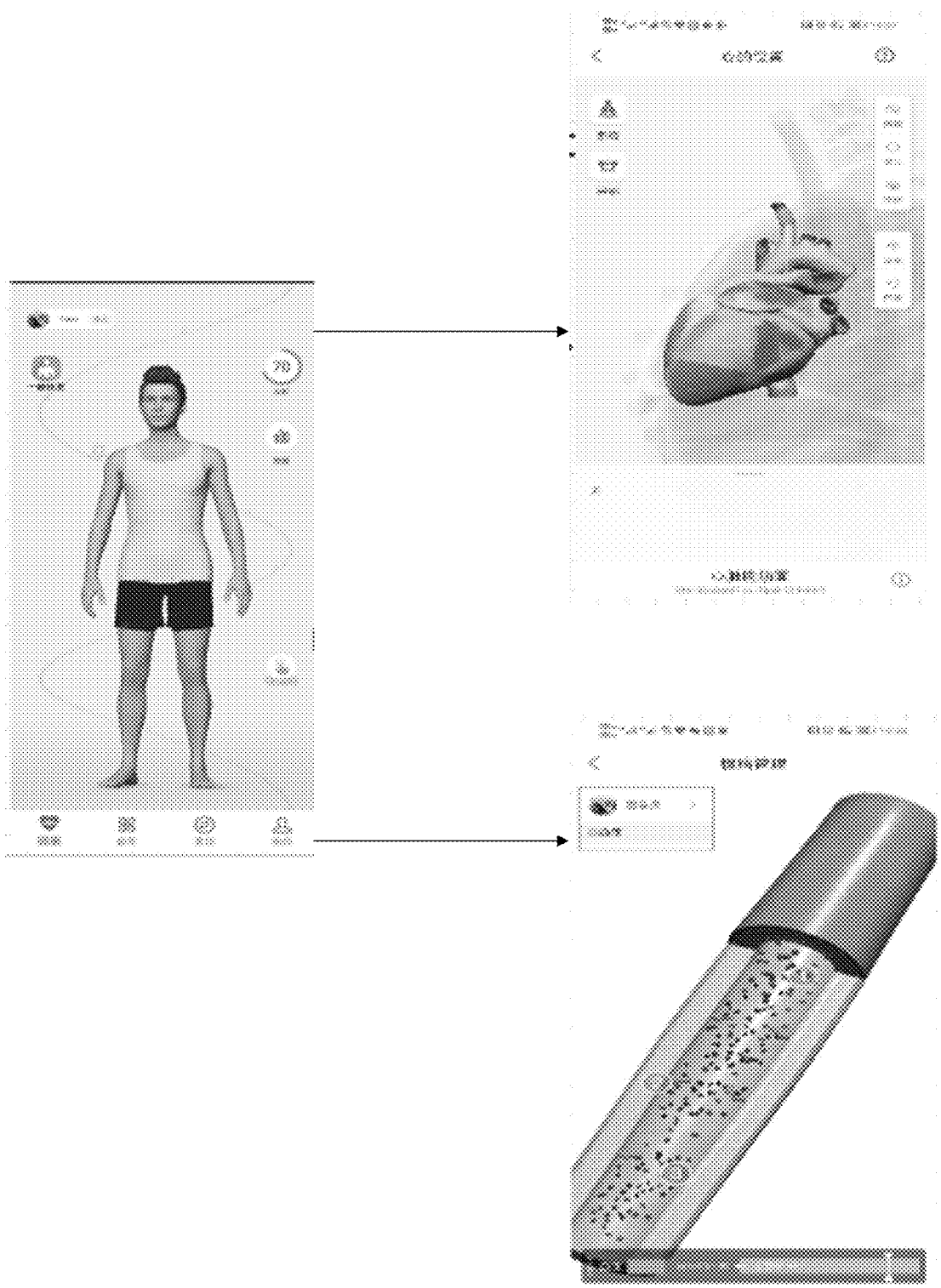
FIG. 3b shows a schematic diagram of interface switching for an application development project provided by an embodiment of this application.

A scene development project refers to a tool for developing a scene required for an application development project, and it is used to provide an Activity interface developed by the application development project with various scenes, for example, a Unity project. With the Unity project, multiple three-dimensional scenes, namely, 3D scenes, may be developed according to the needs of the Activity interface. The three-dimensional scenes may be different three-dimensional scenes developed based on the same Activity interface, for example, as shown in FIG. 3*a*, from left to right are a human body, pain point clicks and zoomed-in display of the clicked portions in the same Activity interface; the scenes may also be different scenes developed based on different Activity interfaces, for example, as shown in FIG. 3*b*, from left to right are a human body, a heart and chronic disease management in different Activity interfaces. The scenes may include scenes of various dimensions, for example, 2D, 3D, etc. This text is described mainly taking a three-dimensional scene as an example, but the disclosure is not limited thereto.

An application development project is a tool for implementing client development. A client includes, but is not limited to, an application pre-installed in an electronic device.

A scene refers to three-dimensional image data shown in an Activity interface of an application development project. As shown in FIG. 3*b*, the human body image shown on the left of FIG. 3*b* is a first three-dimensional scene, the heart image shown in the upper right corner of FIG. 3*b* is a second three-dimensional scene, and the vascular image shown in the lower right corner of FIG. 3*b* is a third three-dimensional scene. In an embodiment of this application, it is possible to rapidly implement switching from an Activity interface containing the first three-dimensional scene (i.e., the interface image shown on the left in FIG. 3*b*) to an Activity interface containing the second three-dimensional scene (i.e., the interface image shown in the upper right corner in FIG. 3*b*), or switching from the Activity interface containing the first three-dimensional scene (i.e., the interface image shown on the left in FIG. 3*b*) to an Activity interface containing the third three-dimensional scene (i.e., the interface image shown in the lower right corner in FIG. 3*b*). The Activity interfaces in FIG. 3*b* may be understood as different Activity interfaces. These Activity interfaces are developed and obtained by the application development project.

At the above steps, the application development project may be added into the scene development project. A way of addition is, for example, but not limited to, placing a jar file complied and obtained by an Android development project into the scene development project in the form of a plug-in. The scene development project needs to create the entire developed project into an apk file, for example, install it onto a mobile terminal or a simulator, for example, for running.

It may also be possible to add the scene development project into the application development project. A way of addition is for example, but not limited to, importing the Unity project into the Android development project in the form of a Module.

At the above steps, when it is needed to load the second Activity interface after loading of the first Activity interface has been already finished in the application development project, the related art calls for example a default interface class that comes with the Unity project, and the default interface class can only render a single scene. When for example the default interface class that comes with the Unity project is called to render a scene in the second Activity interface to be switched, since the default interface class cannot actively identify change in the scene in the second Activity interface to be switched, it can only wait for the Android development project to conduct data interaction with the scene development project, to query a scene in the second Activity interface to be filled, and after the scene development project obtains the scene to be filled by query, it is then sent to the Android development project, and the rendering is controlled by a life cycle of the Android development project. It needs to take a long time for the scene development project to query multiple scenes that are created, and therefore this results in that a problem of black screen or getting stuck or the like will occur in loading a scene in the second Activity interface when switching from the first Activity interface to the second Activity interface.

An embodiment of this application proposes that when an operation of loading the second Activity interface is received in the application development project, it may be possible to, in response to the operation of loading the second Activity interface, first remove the first three-dimensional scene contained in the first Activity interface, and then load the second Activity interface, that is, load the second Activity interface that has already been developed by the application development project from the application development project. The problem of getting stuck or delay will not exist in loading an identical or different Activity interface in the same application development project.

Then, the first three-dimensional scene that has already been loaded in the first Activity interface is again loaded in the second Activity interface. Since the first three-dimensional scene has already been loaded in the first Activity interface before, that is, a call relationship has already been established between the application development project and an interface class provided by the Unity project, the application development project only needs to call an interface class object so as to be able to realize loading of the first three-dimensional scene in the second Activity interface, when the first three-dimensional scene is again loaded in the second Activity interface. Therein, the interface class object is obtained by inheriting an interface class of the scene development project, and the interface class object may be stored at a global variable storage location corresponding to the application development project after loading of the first three-dimensional scene of the first Activity interface is finished. The global variable storage location includes, but is not limited to, a cache area corresponding to the application development project.

In a process of loading the first Activity interface, the first Activity interface may be rendered according to a life cycle of an Activity interface of the application development project; the life cycle includes multiple callback functions, for example, a callback method for creating an Activity interface is called, and the first Activity interface is filled with a predefined layout required for an Activity interface developed by the application development project; and obtaining a focus of the first three-dimensional scene contained in the first Activity interface is performed and displaying the first three-dimensional scene contained in the first Activity interface at the front end is controlled.

After the callback method for creating an Activity interface is called, rendering of the first Activity interface is finished, and then the interface class object may be obtained based on inheriting an interface class provided by the scene development project, in which interface class object a call relationship between it and the application development project is reserved, namely, a life cycle of an Activity interface of the application development project which is predefined in the interface class. The life cycle includes at least the callback method for creating an Activity interface, and the callback method for creating an Activity interface includes a customized callback function for laying out and controlling the Activity interface to be visible.

In a process of loading the second Activity interface, the second three-dimensional scene may be found and obtained directly using an interface class object, that is, the second three-dimensional scene corresponding to the second Activity interface is determined via an interface class object, and this may effectively save time required for repeatedly finding the call relationship between the application development project and the scene development project and re-establishing the call relationship. In millisecond-level scene switching, this method may effectively solve the problems of black screen and getting stuck due to scene switching during complex scene interaction.

Based on the above embodiments, the scene switching method for an application development project proposed by this application may not only be used in a development phase of an application, but also be used in an application phase of the application.

During use in the development phase of the application, after the first Activity interface is loaded, a program developer inputs an operation instruction of switching to the second Activity interface. During use in the application phase of the application, the application may be pre-installed in an electronic device. The electronic device includes, but is not limited to, various mobile terminals, notebook computers, smart phones, tablet computers and portable wearable devices, etc. After the application is pre-installed into the electronic device, a user may operate an Activity interface for controlling start of the application. After loading and displaying the first Activity interface, an operation of switching to the second Activity interface is inputted for the first Activity interface. In response to the operation, the second Activity interface is loaded and displayed in a display interface. The operation includes, but is not limited to, a click operation, a slide operation or voice control operation, etc. inputted by the user for a first three-dimensional image displayed in the first Activity interface. Of course, switching from the first Activity interface to the second Activity interface may also be based on an automatic way, for example, a switching operation triggered by automatic identification of the user's identity (based on iris, face, fingerprint, etc.).

After loading and displaying the first Activity interface as described above, the second Activity interface is loaded by calling an interface class object corresponding to the first Activity interface which is pre-stored, first the first three-dimensional scene contained in the first Activity interface is loaded in the second Activity interface, then the first three-dimensional scene is removed, and then the second three-dimensional scene is loaded in the second Activity interface.

By calling an interface class object which is pre-stored, the embodiments of this application increase the display speed of loading the second three-dimensional scene in the second Activity interface, thereby improve the fluency of switching Activity interfaces, and at least partly suppress the problems of black screen, getting stuck, etc., which is conducive to improving the user experience.

Figure 2:
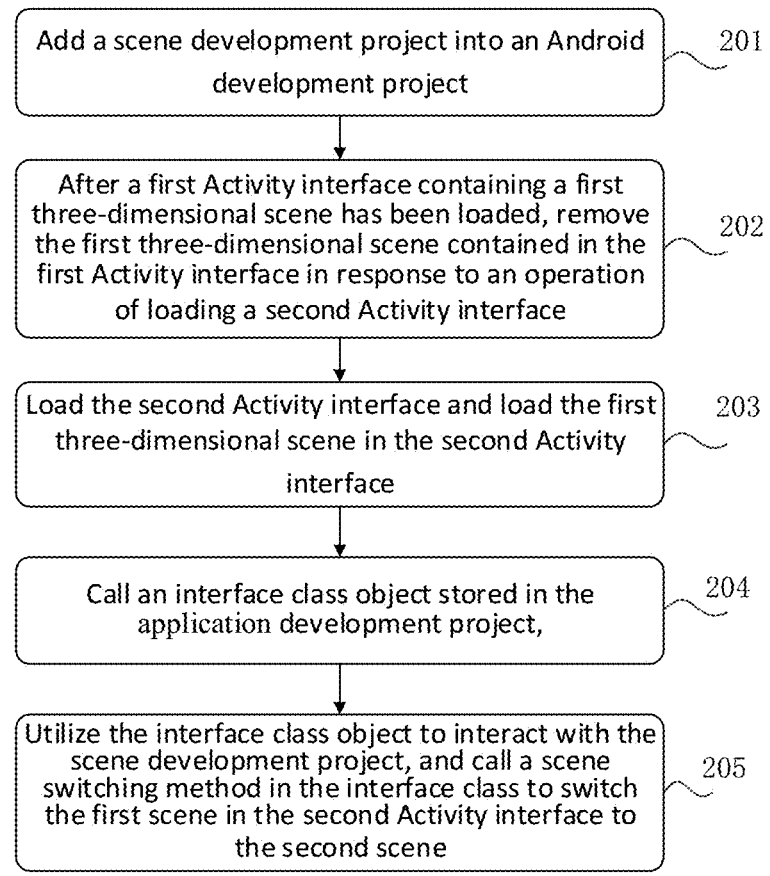
FIG. 2 shows a flow diagram of another scene switching method for an application development project provided by an embodiment of this application.

On the basis of the above embodiments, an embodiment of this application further provides a scene switching method for an application development project, which method may also be applied in the application development phase and the application use phase. As shown in FIG. 2, FIG. 2 shows a flow diagram of a scene switching method provided by an embodiment of this application. The method may be performed by a scene switching apparatus, which scene switching apparatus may be configured in an electronic device. The method includes:

step 201, adding a scene development project into an application development project, the scene development project being used for providing an Activity interface developed by the application development project with a scene and the scene development project including multiple three-dimensional scenes which are developed;

step 202, after a first Activity interface containing a first three-dimensional scene has been loaded, removing the first three-dimensional scene contained in the first Activity interface in response to an operation of loading a second Activity interface;

step 203, loading the second Activity interface and loading the first three-dimensional scene in the second Activity interface;

step 204, calling an interface class object stored in the application development project; and step 205, utilizing the interface class object to interact with the scene development project, to switch a first scene (two-dimensional) in the second Activity interface to a second scene (three-dimensional).

At the above steps, the interface class object is obtained by inheriting an interface class defined in the scene development project when loading the first Activity interface, a life cycle of an Activity interface of the application development project has already been predefined in the interface class, the life cycle includes a callback method for creating an Activity interface, and the callback method for creating an Activity interface includes a customized callback function for laying out and controlling the Activity interface to be visible.

Loading the first Activity interface containing the first three-dimensional scene in the application development project may include:

rendering the first Activity interface according to a life cycle corresponding to the application development project, the life cycle corresponding to the application development project including a callback method for creating an Activity interface developed by the application development project;

calling the callback method for creating an Activity interface developed by the application development project, and filling the first Activity interface with a layout file developed by the application development project which is predefined; and obtaining the first three-dimensional scene according to a function of a focus of a three-dimensional scene view and displaying the first three-dimensional scene at the front end when the callback method is called back.

Optionally, after the first Activity interface containing the first three-dimensional scene has already been loaded in the application development project, said method further includes:

storing the interface class object at a global variable storage location of the application development project.

For example, the scene development project is a Unity project, an interface class for interacting with the outside is defined in the Unity project, and the interface class is for example a UnityPlayerActivity class.

The life cycle corresponding to the application development project is defined in the UnityPlayerActivity class. The life cycle may include multiple callback methods, for example, an Oncreate callback method (i.e., the callback method for creating an Activity interface), an OnRestart callback method (i.e., a callback method for restarting an Activity interface).

An embodiment of this application proposes to predefine in the Oncreate callback method:

setting layouts corresponding to multiple three-dimensional scenes contained in an Activity interface;

finding a layout corresponding to an Activity interface to be created;

obtaining a focus of a three-dimensional scene to determine a three-dimensional scene corresponding to the Activity interface to be created; and calling a function for displaying a three-dimensional scene at the front end.

By the setContview(R.layout.activity_main2) function, the above callback method may set layouts respectively corresponding to the multiple three-dimensional scenes contained in the Activity interface. Here, loading of different Activity interfaces may be achieved by predefining multiple different layouts, whereas in the related art, a default layout file needs to be called back and forth multiple times for different Activity interfaces.

Then, callback query between multiple Activity interfaces is achieved by predefining a function for finding a layout corresponding to the Activity interface to be created.

For example, a target Activity interface may be determined by root=findViewById (R.id.root_layout). The target Activity interface is an interface to be shown in Activity interfaces developed by the application development project, and the target Activity interface include a positional relationship of a layout file and a target three-dimensional scene. If the target Activity interface is the same Activity interface, an Activity interface may be loaded according to a layout corresponding to an Activity interface identification. If the Activity interface identification is different, then a layout corresponding to an Activity interface identification may be obtained to load an Activity interface according to the different Activity interface identification.

A function for obtaining a focus of a three-dimensional scene view and a callback function for displaying a three-dimensional scene at the front end are predefined. By the function for obtaining a focus of a three-dimensional scene view, for example, mUnityPlayer.requestFocus( ), a three-dimensional scene corresponding to the target Activity interface is found, and then displaying the three-dimensional scene at the front end is achieved by mUnityPlayer.resume ( ).

An embodiment of this application proposes a new Oncreate callback method, which contains function statements for performing an Onstart callback method: mUnityPlayer.requestFocus( ) and mUnityPlayer.resume( ). That is, the Oncreate callback method provided by the embodiment of this application may include:

pre-creating multiple layouts by setContview(R.layout.activity_main2);

finding a layout corresponding to the Activity interface to be created by root=findViewById(R.id.root_layout);

determining a three-dimensional scene corresponding to the Activity interface to be created by mUnityPlayer.requestFocus( ); and displaying the three-dimensional scene at the front end by mUnityPlayer.resume( ).

In the embodiment of this application, as compared with the related art, when performing the callback method for creating an Activity interface developed by the application development project, a new layout function that is predefined is obtained, then the function for obtaining a focus of a three-dimensional scene is performed, and finally the function for displaying a three-dimensional scene at the front end is further performed when the callback method is called back. By performing the modified callback method, the time required for three-dimensional scene switching may be saved effectively, thereby improving the efficiency of loading an Activity interface.

On the basis of the above embodiments, this application further proposes a mechanism of predefining a removal-addition-replacement in the callback method for restarting an Activity interface;

a function for removing a three-dimensional scene in any one Activity interface when the any one Activity interface is restarted; and a function for re-loading a three-dimensional scene in any one Activity interface.

In the callback method for restarting an Activity interface, namely, the OnRestart callback method, a removal-addition-replacement mechanism is predefined, and each time restart of an Activity interface is conducted, it may be possible to first remove the three-dimensional scene contained in the Activity interface, then add the removed three-dimensional scene, and finally conduct switching of the three-dimensional scene. By such processing, it may be possible to achieve switching of multiple complex three-dimensional scenes and partially solve the problems of flashback and black screen.

The above-mentioned interface class object may be for example a UnityPlayer class object. The UnityPlayer class object is obtained by inheriting a UnityPlayerActivity class provided by the application development project when the first Activity interface containing the first three-dimensional scene is loaded in the application development project the first time.

By the callback method, a scheme may be realized in which fluent switching of multiple complex three-dimensional scenes is achieved data interaction may be conducted in an application development project. On the basis of realizing that a Unity project is imported into an application development project, a life cycle of an Activity interface in the application development project is utilized cleverly, a rendered scene is initialized in the Oncreate callback function, a unityPlayer class is started, scene switching is realized using the removal-addition-replacement mechanism in the OnRestart callback function. The way of the removal-addition-replacement mechanism solves various problems that easily occur in switching of multiple complex scenes and at the same time can also realize scene interaction of the Unity project.

For the above method provided by the embodiment of this application, there may not be obvious improvement on its processing time when a three-dimensional scene is loaded for the first time or for a single time, however, after the three-dimensional scene is loaded for the first time, the time required for loading a new three-dimensional scene will be shortened obviously if three-dimensional scene switching is conducted in an Activity interface, and the above method may effectively improve the processing efficiency of scene switching.

On the basis of the above embodiments, the first Activity interface and the second Activity interface are identical Activity interfaces. For example, layouts of the Activity interfaces are identical and the loaded three-dimensional scenes are identical, that is, an operation of restarting the same Activity interface is implemented. It may also be such that layouts of the first Activity interface and the second Activity interface are identical, and loaded three-dimensional scenes are different. In an embodiment of this application, when the first Activity interface and the second Activity interface are identical, an interface class object that is pre-stored is directly called to implement finding of a three-dimensional scene, which may effectively shorten the time of three-dimensional scene switching in an Activity interface and improve the fluency of three-dimensional scene switching.

On the basis of the above embodiments, the first Activity interface and the second Activity interface are different Activity interfaces. For example, layouts of the Activity interfaces are different and the three-dimensional scenes loaded respectively are also different. In an embodiment of this application, when the first Activity interface and the second Activity interface are different, calling an interface class object that is pre-stored may be via an Oncreate callback method contained in the interface class object that is pre-stored, a layout file corresponding to the second Activity interface is obtained, then a target scene contained in the second Activity interface is obtained according to a function for obtaining a focus of a three-dimensional scene, and a function for displaying a three-dimensional scene at the front end is performed to display the target scene contained in the second Activity interface, which may effectively shorten the time of switching between different Activity interfaces, and at the same time also shorten the switching time of different three-dimensional scenes in different Activity interfaces.

The embodiment of this application saves the time required for loading a three-dimensional scene for each Activity interface by modifying a part of callback methods contained in a life cycle corresponding to the application development project, and implements switching between multiple three-dimensional scenes by a removal-addition-switching mechanism in a callback method, overcoming the problems of flashback, black screen, etc. due to scene switching in the related art.

The flow charts and block diagrams in the drawings illustrate system architectures, functions and operations that may be implemented by the system, method and computer program product of the various embodiments of this disclosure. In this respect, each box in the flow charts or block diagrams may represent a portion of a code, a program segment, or a module, and the portion of the code, the program segment, or the module contains one or more executable instruction for implementing a specified logic function. It should also be noted that in some alternative implementations, functions marked in boxes may also take place in an order other than those marked in the drawings. For example, two successively marked boxes may in fact be implemented basically in parallel, and they sometimes may also be implemented in a reverse order, which depends on the involved function. It should also be noted that each box in the block diagrams and/or flow charts and a combination of boxes in the block diagrams and/or flow charts may be implemented by a dedicated hardware-based system for implementing a specified function or operation, or may be implemented by a combination of dedicated hardware and computer instructions.

Figure 4:
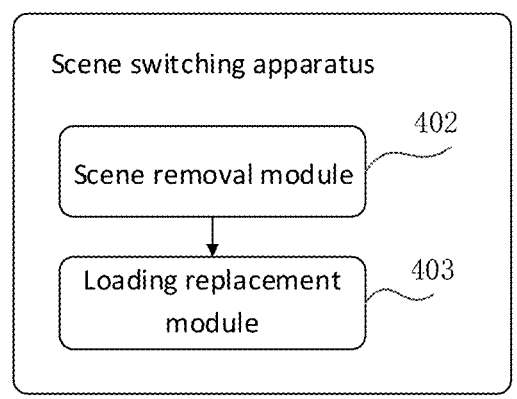
FIG. 4 shows a structure diagram of a scene switching apparatus for an application development project provided by an embodiment of this application.

In the following, reference is made to FIG. 4, which shows a structure diagram of a scene switching apparatus provided by an embodiment of this application. The apparatus may be configured in a server, pre-downloaded from the server to an electronic device for use, or also may be pre-installed in the electronic device. The apparatus includes:

a scene removal module 402 for, after having loaded a first Activity interface, removing a first three-dimensional scene contained in the first Activity interface in response to an operation of loading a second Activity interface; and a loading replacement module 403 for loading the second Activity interface and loading the first three-dimensional scene in the second Activity interface; and replacing the first three-dimensional scene with a second three-dimensional scene in multiple three-dimensional scenes in the second Activity interface, the multiple three-dimensional scenes being provided by a scene development project imported into an application development project in advance, the first Activity interface and the second Activity interface being developed and obtained by the application development project.

The apparatus may further include: a projection addition module for adding a scene development project into an application development project, the scene development project being used for providing an Activity interface developed by the application development project with a scene and the scene development project including multiple three-dimensional scenes which are developed;

wherein the loading replacement module is further used for:

calling an interface class object stored in the application development project; and utilizing the interface class object to interact with the scene development project, to switch a first scene in the second Activity interface to a second three-dimensional scene, the interface class object being obtained by inheriting an interface class defined in the scene development project when loading the first Activity interface, a life cycle of an Activity interface of the application development project having already been predefined in the interface class, the life cycle including a callback method for creating an Activity interface, and the callback method for creating an Activity interface including a customized callback function for laying out and controlling the Activity interface to be visible.

The apparatus further includes a function definition module for defining a callback method for creating an Activity interface. The function definition module is further used for:

setting layouts corresponding to the multiple three-dimensional scenes contained in an Activity interface;

finding a layout corresponding to the Activity interface to be created;

obtaining a focus of the three-dimensional scene to determine a three-dimensional scene corresponding to the Activity interface to be created; and calling a callback method for displaying the three-dimensional scene at the front end.

The function definition module is further used for defining a callback method for restarting an Activity interface, defining in the callback method for restarting an Activity interface removing a three-dimensional scene in any one Activity interface when the any one Activity interface is restarted; and re-loading a three-dimensional scene in the any one Activity interface.

The apparatus further includes: a storage module for storing the interface class object at a global variable storage location of the application development project after the first Activity interface containing the first three-dimensional scene has already been loaded in the application development project.

Optionally, the loading replacement module is further used for:

calling a callback method for creating an Activity interface, and filling the first Activity interface with a predefined layout required for an Activity interface developed by the application development project; and performing obtaining of a focus of the first three-dimensional scene contained in the first Activity interface and controlling displaying of the first three-dimensional scene contained in the first Activity interface at the front end.

Optionally, the first Activity interface and the second Activity interface are identical Activity interfaces.

Optionally, the first Activity interface and the second Activity interface are different Activity interfaces.

It should be appreciated that the various units or modules recorded in the above apparatus correspond to the various steps in the method described with reference to FIG. 1. Therefore, the operations and features described with respect to the method equally apply to the apparatus and the units contained therein, which will not be repeated here any longer. The apparatus may pre-implemented in a browser or other security projects of an electronic device, or also may be loaded by way of download or the like into the browser or other security projects of the electronic device. Corresponding units in the apparatus may cooperate with units in the electronic device to realize the schemes of the embodiments of this application.

Several modules or units are mentioned in the above detailed description, and such a division is not mandatory. In fact, according to an implementation of this disclosure, features and functions of two or more modules or units described in the above may be embodied in one module or unit. On the contrary, features and functions of one module or unit described in the above may further be divided to be embodied by multiple modules or units.

In the following, reference is made to FIG. 5, which shows a structure diagram of a processing system of an electronic device provided by an embodiment of this application.

Figure 5:
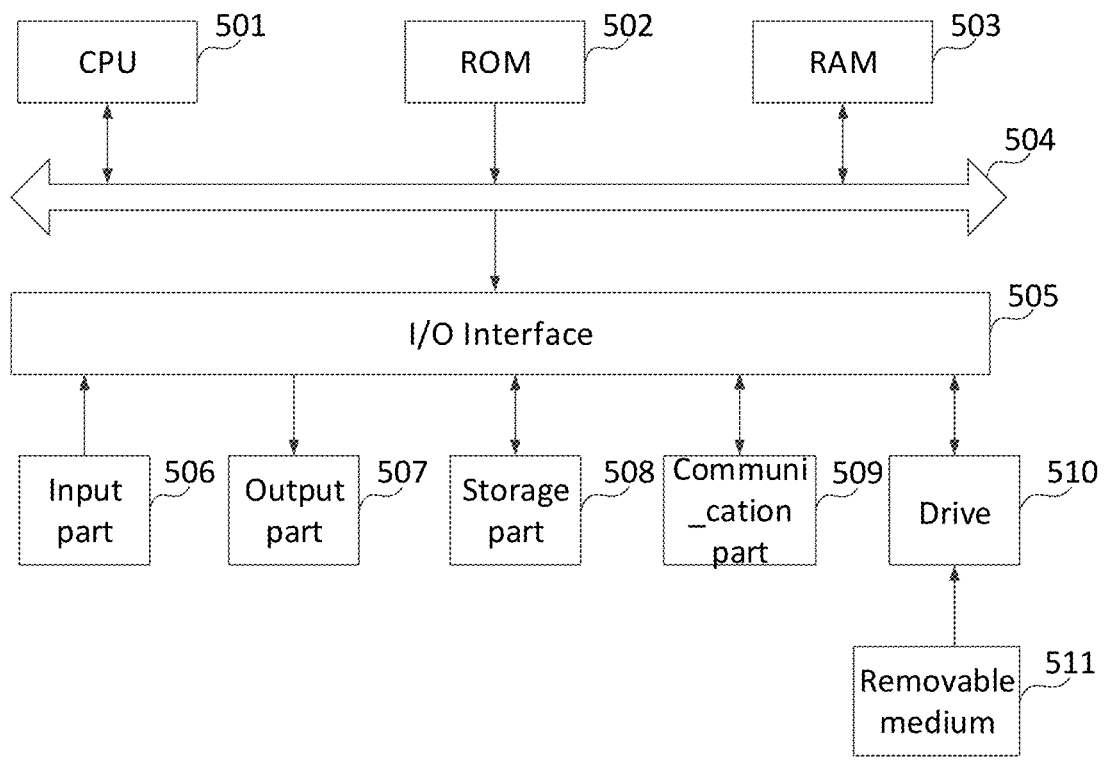
FIG. 5 shows a structure diagram of a processing system of an electronic device provided by an embodiment of this application.

As shown in FIG. 5, a computer system includes a central processing unit (CPU) 501, which may perform various suitable actions and processing according to a program stored in a read-only memory (ROM) 502 or a program loaded from a storage part 508 to a random access memory (RAM) 503. Various programs and data required for operations are further stored in the RAM 503. The CPU 501, the ROM 502 and the RAM 503 are connected with each other via a bus 504. An input/output (I/O) interface 505 is also connected to the bus 504.

The following components are connected to the I/O interface 505: an input part 506 including a keyboard, a mouse, etc.; an output part 507 including for example a cathode ray tube (CRT), a liquid crystal display (LCD), etc. and a speaker, etc.; a storage part 508 including a hard disk, etc.; and a communication part 509 including a network interface card such as a LAN card, a modem, etc. The communication part 509 performs communication processing via a network such as Internet. A drive 510 is also connected to the I/O interface 505 as needed. A removable medium 511 such as a magnetic disk, an optical disk, a magneto-optical disk, a semiconductor device or the like is installed on the drive 510 as needed, in order that a computer program read out from it is installed into the storage part 508 as needed.

In particular, according to an embodiment of this disclosure, the processes described above with reference to the flow charts FIGS. 1-2 may be implemented as a computer software program. For example, an embodiment of this disclosure includes a computer program product including a computer program carried on a computer readable medium, which computer program contains program codes for implementing a method as shown in a flow chart. In such an embodiment, the computer program may be downloaded and installed from a network by the communication part 509, and/or installed from the removable medium 511. When executed by the central processing unit (CPU) 501, the computer program implements the above functions defined in the system of this application.

It needs to be noted that the computer readable medium illustrated in this disclosure may be a computer readable signal medium or a computer readable storage medium or any combination of the two. The computer readable storage medium may be for example, but not limited to, an electric, magnetic, optical, electromagnetic, infrared or semiconductor system, apparatus or device, or any combination thereof. More specific examples of the computer readable storage medium may include, but are not limited to, an electrical connection with one or more wire, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this disclosure, the computer readable storage medium may be any tangible medium containing or storing a program, which program may be used by or in combination with an instruction execution system, apparatus or device. In this disclosure, the computer readable signal medium may include a data signal propagated in a baseband or as part of a carrier wave, with a computer readable program code carried thereon. Such a propagated data signal may take a variety of forms, including but not limited to an electromagnetic signal, an optical signal or any suitable combination thereof. The computer readable signal medium may further be any computer readable medium other than the computer readable storage medium, which may send, propagate or transmit a program for being used by or in combination with the instruction execution system, apparatus or device. The program code included in the computer readable medium may be transmitted by any suitable medium, including but not limited to wireless, wire, cable, RF, etc., or any suitable combination thereof.

The flow charts and block diagrams in the drawings illustrate system architectures, functions and operations that may be implemented by the system, method and computer program product of the various embodiments of this disclosure. In this respect, each box in the flow charts or block diagrams may represent a portion of a code, a program segment, or a module, and the portion of the code, the program segment, or the module contains one or more executable instruction for implementing a specified logic function. It should also be noted that in some alternative implementations, functions marked in boxes may also take place in an order other than those marked in the drawings. For example, two successively marked boxes may in fact be implemented basically in parallel, and they sometimes may also be implemented in a reverse order, which depends on the involved function. It should also be noted that each box in the block diagrams and/or flow charts and a combination of boxes in the block diagrams and/or flow charts may be implemented by a dedicated hardware-based system for implementing a specified function or operation, or may be implemented by a combination of dedicated hardware and computer instructions.

An involved unit or module described in an embodiment of this application may be implemented by way of software, or also may be implemented by way of hardware. The described units or modules may also be arranged in a processor, which for example may be described as: a processor including a project removal module and a loading replacement module, etc. Therein, in some case, the names of these units or modules do not constitute a limitation to the units or modules themselves. For example, a project addition module may further be described as "a module for adding a scene development project into an application development project".

On the other hand, this application further provides a computer readable storage medium, which may be one contained in an electronic device described in the above embodiments, or also may be one which is stand-alone and is not assembled into the electronic device. The computer readable storage medium stores one or more program, which is used by one or more processor to perform a scene switching method in hybrid development described in this application.

Various techniques may be described herein in the general context of software, hardware elements, or program modules. Generally, such modules include routines, programs, objects, elements, components, data structures, and so forth that perform particular tasks or implement particular abstract data types. The terms "module" and "component" as used herein generally represent software, firmware, hardware, or a combination thereof. The features of the techniques described herein are platform-independent, meaning that the techniques may be implemented on a variety of computing platforms having a variety of processors.

What is described above is just the preferable embodiments of the application and the illustration of the applied technical principles. It should be appreciated by the person having ordinary skills in the art that the scope of the disclosure involved in this application is not limited to technical solutions formed by specific combinations of the above technical features, and at the same time, should also encompass other technical solutions formed by any combinations of the above technical features or their equivalent features, without departing from the concepts of the disclosure, for example, technical solutions formed by the above features and technical features (not limited thereto) disclosed in the application and having similar functions replacing each other.

The invention claimed is:

1. A scene switching method for an application development project, the method comprising:
　　after having loaded a first Activity interface of the application development project, removing a first scene contained in the first Activity interface in response to an operation of loading a second Activity interface of the application development project;
　　loading the second Activity interface and loading the first scene in the second Activity interface; and
　　replacing the first scene with a second scene in multiple scenes in the second Activity interface, the multiple scenes being provided by a scene development project imported into the application development project in advance, and the first Activity interface and the second Activity interface being developed and obtained by the application development project, wherein the replacing the first scene with the second scene in the multiple scenes in the second Activity interface comprises:

calling an interface class object stored in the application development project; and utilizing the interface class object to interact with the scene development project, to switch the first scene in the second Activity interface to the second scene, the interface class object being obtained by inheriting an interface class defined in the scene development project when loading the first Activity interface, a life cycle of an Activity interface of the application development project having already been predefined in the interface class, the life cycle comprising a callback method for creating the Activity interface, and the callback method for creating the Activity interface comprising a customized callback function for laying out and controlling the Activity interface to be visible.

2. The method as claimed in claim 1, wherein the callback method for creating the Activity interface further comprises performing operations comprising:

setting layouts respectively corresponding to the multiple scenes contained in the Activity interface;

finding a layout corresponding to the Activity interface to be created;

obtaining a scene focus to determine a scene corresponding to the Activity interface to be created; and calling a function for displaying the scene at a front end.

3. The method as claimed in claim 1, wherein the life cycle further comprises a callback method for restarting the Activity interface, and wherein the callback method for restarting the Activity interface comprises:

removing a scene in any one Activity interface when the any one Activity interface is restarted; and re-loading a scene in the any one Activity interface.

4. The method as claimed in claim 1, wherein after the first Activity interface has already been loaded, the method further comprises:

storing the interface class object at a global variable storage location corresponding to the application development project.

5. The method as claimed in claim 1, wherein loading the first Activity interface comprises:

calling a callback method for creating the Activity interface, and filling the first Activity interface with a predefined layout required for the Activity interface developed by the application development project; and performing obtaining of a focus of the first scene contained in the first Activity interface and controlling displaying of the first scene contained in the first Activity interface at a front end.

6. The method as claimed in claim 1, wherein the first Activity interface and the second Activity interface are identical Activity interfaces, or the first Activity interface and the second Activity interface are different Activity interfaces.

7. The method as claimed in claim 1, wherein at least one of the first scene or the second scene is a three-dimensional scene.

8. The method as claimed in claim 1, wherein the application development project is an Android development project, and/or the scene development project is a Unity development project.

9. An electronic device comprising a memory, a processor and a computer program which is stored in the memory and can be run on the processor, wherein the processor is configured to execute the computer program to perform operations comprising:

after having loaded a first Activity interface of an application development project, removing a first scene contained in the first Activity interface in response to an operation of loading a second Activity interface of the application development project;

loading the second Activity interface and loading the first scene in the second Activity interface; and replacing the first scene with a second scene in multiple scenes in the second Activity interface, the multiple scenes being provided by a scene development project imported into the application development project in advance, and the first Activity interface and the second Activity interface being developed and obtained by the application development project, wherein the replacing the first scene with the second scene in the multiple scenes in the second Activity interface comprises:

calling an interface class object stored in the application development project; and utilizing the interface class object to interact with the scene development project, to switch the first scene in the second Activity interface to the second scene, the interface class object being obtained by inheriting an interface class defined in the scene development project when loading the first Activity interface, a life cycle of an Activity interface of the application development project having already been predefined in the interface class, the life cycle comprising a callback method for creating the Activity interface, and the callback method for creating the Activity interface comprising a customized callback function for laying out and controlling the Activity interface to be visible.

10. The electronic device as claimed in claim 9, wherein the callback method for creating the Activity interface further comprises performing operations comprising:

setting layouts respectively corresponding to the multiple scenes contained in the Activity interface;

finding a layout corresponding to the Activity interface to be created;

obtaining a scene focus to determine a scene corresponding to the Activity interface to be created; and calling a function for displaying the scene at a front end.

11. The electronic device as claimed in claim 9, wherein the life cycle further comprises a callback method for restarting the Activity interface, and the callback method for restarting the Activity interface comprises:

removing a scene in any one Activity interface when the any one Activity interface is restarted; and re-loading a scene in the any one Activity interface.

12. The electronic device as claimed in claim 9, wherein after the first Activity interface has already been loaded, the processor further implements operations comprising:

storing the interface class object at a global variable storage location corresponding to the application development project.

13. The electronic device as claimed in claim 9, wherein loading the first Activity interface comprises:

calling a callback method for creating the Activity interface, and filling the first Activity interface with a predefined layout required for the Activity interface developed by the application development project; and performing obtaining of a focus of the first scene contained in the first Activity interface and controlling displaying of the first scene contained in the first Activity interface at a front end.

14. The electronic device as claimed in claim 9, wherein the first Activity interface and the second Activity interface are identical Activity interfaces, or the first Activity interface and the second Activity interface are different Activity interfaces.

15. The electronic device as claimed in claim 9, wherein at least one of the first scene or the second scene is a three-dimensional scene.

16. The electronic device as claimed in claim 9, wherein the application development project is an Android development project, and/or the scene development project is a Unity development project.

17. A non-transitory computer readable storage medium storing a computer program thereon, wherein when executed by a processor, the processor is configured to execute the computer program to perform operations comprising:

after having loaded a first Activity interface of an application development project, removing a first scene contained in the first Activity interface in response to an operation of loading a second Activity interface of the application development project;

loading the second Activity interface and loading the first scene in the second Activity interface; and replacing the first scene with a second scene in multiple scenes in the second Activity interface, the multiple scenes being provided by a scene development project imported into the application development project in advance, and the first Activity interface and the second Activity interface being developed and obtained by the application development project, wherein the replacing the first scene with the second scene in the multiple scenes in the second Activity interface comprises:

calling an interface class object stored in the application development project; and utilizing the interface class object to interact with the scene development project, to switch the first scene in the second Activity interface to the second scene, the interface class object being obtained by inheriting an interface class defined in the scene development project when loading the first Activity interface, a life cycle of an Activity interface of the application development project having already been predefined in the interface class, the life cycle comprising a callback method for creating the Activity interface, and the callback method for creating the Activity interface comprising a customized callback function for laying out and controlling the Activity interface to be visible.

\* \* \* \* \*